(12) United States Patent
Voigt

(10) Patent No.: US 10,720,163 B2
(45) Date of Patent: Jul. 21, 2020

(54) METHOD FOR CHECKING AN ONBOARD SPEECH DETECTION SYSTEM OF A MOTOR VEHICLE AND CONTROL DEVICE AND MOTOR VEHICLE

(71) Applicant: AUDI AG, Ingolstadt (DE)

(72) Inventor: Christoph Voigt, Großmehring (DE)

(73) Assignee: AUDI AG, Ingolstadt (DE)

( * ) Notice: Subject to any disclaimer, the term of this patent is extended or adjusted under 35 U.S.C. 154(b) by 105 days.

(21) Appl. No.: 16/183,031

(22) Filed: Nov. 7, 2018

(65) Prior Publication Data

US 2019/0147873 A1 May 16, 2019

(30) Foreign Application Priority Data

Nov. 14, 2017 (DE) .......................... 10 2017 220266

(51) Int. Cl.
*G10L 15/32* (2013.01)
*G10L 15/197* (2013.01)
*G10L 15/22* (2006.01)
*G10L 15/30* (2013.01)

(52) U.S. Cl.
CPC ............ *G10L 15/32* (2013.01); *G10L 15/197* (2013.01); *G10L 15/22* (2013.01); *G10L 15/30* (2013.01); *G10L 2015/223* (2013.01)

(58) Field of Classification Search
CPC ................................ G10L 15/30; G10L 15/32
See application file for complete search history.

(56) References Cited

U.S. PATENT DOCUMENTS

| | | | |
|---|---|---|---|
| 9,020,823 B2 | 4/2015 | Hoepken et al. | |
| 2006/0122836 A1* | 6/2006 | Cross, Jr. | H04M 1/72561 704/260 |
| 2006/0235684 A1 | 10/2006 | Chang | |
| 2007/0027693 A1* | 2/2007 | Hanazawa | G10L 15/32 704/275 |
| 2016/0217788 A1 | 7/2016 | Stonehocker et al. | |
| 2016/0379626 A1* | 12/2016 | Deisher | G10L 15/197 704/232 |

(Continued)

FOREIGN PATENT DOCUMENTS

| | | |
|---|---|---|
| DE | 102005018174 A1 | 11/2006 |
| DE | 102008025532 A1 | 12/2009 |

(Continued)

*Primary Examiner* — Douglas Godbold
(74) *Attorney, Agent, or Firm* — Sterne, Kessler, Goldstein & Fox P.L.L.C.

(57) ABSTRACT

The present disclosure relates to systems and methods for checking an onboard speech recognition system of a motor vehicle, wherein, in an online mode, a recognition result of an online speech recognition service, and a recognition result of the onboard speech recognition system, are received for a voice input, and a comparison result of the recognition results is ascertained. A result pattern is received from the onboard speech recognition system for the voice input, and the result pattern, together with the comparison result, is stored in a pattern memory unit. In an offline mode, the recognition result of the onboard speech recognition system and the associated present result pattern are received for a further voice input, and a search for an agreeing, stored recognition situation is carried out based on the present result pattern.

9 Claims, 3 Drawing Sheets

(56) References Cited

U.S. PATENT DOCUMENTS

2017/0140759 A1* 5/2017 Kumar .................... G10L 15/32
2019/0206388 A1* 7/2019 Aggarwal ............... G10L 15/07

FOREIGN PATENT DOCUMENTS

DE     102009051508 A1    5/2011
KR     1020160006682 A    1/2006
WO     WO 2014/186143 A1  11/2014

* cited by examiner

METHOD FOR CHECKING AN ONBOARD SPEECH DETECTION SYSTEM OF A MOTOR VEHICLE AND CONTROL DEVICE AND MOTOR VEHICLE

TECHNICAL FIELD

The present disclosure relates to a method for checking an automatic speech recognition system provided in a motor vehicle. This speech recognition system is referred to hereafter as an onboard speech recognition system. The onboard speech recognition system can carry out automatic speech recognition (ASR) to identify speech content of voice input of a user. The present disclosure also describes a control device for a motor vehicle to be able to carry out the method according to embodiments of the present disclosure, and a motor vehicle comprising the control device.

BACKGROUND

In a motor vehicle, an onboard speech recognition system can be provided, for example, for voice control of vehicle components. A user can then speak a voice command, for example, which is provided to the onboard speech recognition system as voice input. The system then generates a recognition result for the voice input, which describes or indicates speech content identified in the voice input, which is to say the voice command.

However, due to limited processing resources, the recognition vocabulary of an onboard speech recognition system is restricted. Moreover, the statistical recognition model, for example a hidden Markov model (HMM), is also limited by the processing power available to the motor vehicle.

For this reason, what is known as hybrid speech recognition may be provided in a motor vehicle, in which an online speech recognition service is additionally used via a communication link. This service is likewise provided with the voice input via the communication link. The online speech recognition service can be implemented by a server of the Internet, for example. The recognition result of the speech recognition service is then provided in the motor vehicle again via the communication link. However, two recognition results are now available in the motor vehicle, these being that of the onboard speech recognition system and that of the online speech recognition service. These two recognition results are provided to a decision unit or an arbiter unit, which initially, based on a comparison, ascertains a comparison result that indicates whether the two recognition results deviate from one another. Depending on this comparison result, a decision can then be made as to whether one of the recognition results is to be used. In general, the recognition result of the online speech recognition service is more reliable, and thus to be preferred, since the online speech recognition service has more processing resources, and consequently a more extensive recognition vocabulary, as well as a more complex statistical recognition model available than the onboard speech recognition system. In this way, an incorrect recognition result of the onboard speech recognition system can be identified and suppressed when a communication link exists.

Still, it may be necessary at times to rely exclusively on the onboard speech recognition system in the motor vehicle since the communication link has been interrupted or is not available. The communication link can be formed, for example, based on a mobile communication connection and/or a wireless local area network (WLAN) connection. If such a wireless connection is presently not possible, the online speech recognition service also cannot be utilized in the motor vehicle.

Onboard speech recognition systems for voice control are known from DE 10 2009 051 508 A1 and DE 10 2008 025 532 A1, for example. So as to conduct a plausibility check of a recognition result of an onboard speech recognition system, it is known from DE 10 2005 018 174 A1 to select the result that provides the best match to entries of a database from multiple possible recognition results.

It is the object of the present disclosure to conduct a plausibility check for a recognition result of an onboard speech recognition system of a motor vehicle when it is presently not possible to check the result by way of an online speech recognition service.

The object is achieved by the subject matter of the independent claims. Advantageous embodiments of the present disclosure are described by the dependent claims, the following description, and the figures.

SUMMARY

The present disclosure provides a method for checking an onboard speech recognition system of a motor vehicle. The check is carried out in the event that a communication link to an online speech recognition service is interrupted. When the communication link has been established or provided, an online mode results, while an offline mode results when the communication link is interrupted. In the online mode (with a communication link), in the method an arbiter unit or a decision unit of the motor vehicle receives both a recognition result of the online speech recognition service coupled via the communication link, and a recognition result of the onboard speech recognition system, for at least one voice input of a user, which is to say a speech utterance or a phrase. The arbiter unit ascertains a comparison result that indicates whether the two recognition results deviate from one another. Depending on the comparison result, one of the two recognition results can then be used.

The method according to the present disclosure relates to said offline modus. For this purpose, initially, while still in the online mode, a result pattern is additionally received for the at least one voice input from the onboard speech recognition system of the system for the recognition result thereof. The result pattern describes a respective present recognition situation of the onboard speech recognition system. The result pattern is stored, together with the associated comparison result concerning the two received recognition results, in a pattern memory unit for recognition situations. Thus, at least one result pattern, together with an associated or assigned comparison result, can be stored in the pattern memory unit. However, it is also possible to combine multiple result patterns and the associated comparison results, which is to say, in general, the pattern memory unit is updated by way of the present result pattern and the associated comparison result. It is then possible at a later time, based on the pattern memory unit, to check with respect to an appropriate recognition situation, in which the result pattern in the onboard speech recognition system was yielded, whether or not the two recognition results deviated from one another.

In the offline mode, in which the communication link to the online speech recognition service is interrupted, the arbiter unit then receives the respective recognition result of the onboard speech recognition system, and the associated result pattern of the onboard speech recognition system, for at least one further voice input. Due to the interrupted communication link, a recognition result of the online speech recognition service cannot be ascertained. Thus, only a recognition result of the onboard speech recognition system is available. Now, it must be checked whether this recognition result is plausible. In the online mode, the recognition result of the online speech recognition service could be utilized for this purpose. However, since this is absent, according to the present disclosure a search for a stored result pattern that agrees with the present result pattern of the onboard speech recognition system according to a predetermined agreement criterion is carried out, and the assigned or associated comparison result thereof is ascertained or read out from the pattern memory unit. In general, it may be provided that a search for an agreeing stored recognition situation according to a predetermined agreement criterion is carried out in the pattern memory unit based on the present result pattern, and a representative comparison result stored for this recognition situation is read out. Thus, it is ascertained which comparison result was yielded in the past in the online mode in a recognition situation that agrees with the present recognition situation according to the agreement criterion. In the event that this comparison result indicates a deviation, the present recognition result is discarded in the offline mode. If, in contrast, the comparison result indicates that there was agreement, the recognition result can be used in the motor vehicle for an operating process using voice control, for example, or for controlling a speech dialog.

Despite an interrupted communication link, it is thus reconstructed, by way of the pattern memory unit, which comparison result had previously been yielded in a similar recognition situation, or in an agreeing recognition situation according to the agreement criterion, while the online mode was active, which is to say a recognition result of the online speech recognition service was available. Since no recognition result of the online speech recognition service is now available in the offline mode, the comparison result is reconstructed based on the pattern memory unit. For this purpose, the pattern memory unit can be configured as a database or a data memory, for example.

The present disclosure yields the advantage that the plausibility of a recognition result of an onboard speech recognition system can be checked even when the online speech recognition service is not available. If no agreeing result pattern can be ascertained in the pattern memory unit for a present result pattern in the offline mode, the present recognition result must be checked based on at least one further criterion. In this case, the present recognition result may also simply be discarded.

The present disclosure also describes embodiments that yield additional advantages.

According to one embodiment, said result pattern of the onboard speech recognition system includes a sequence of syllables identified by a statistical recognition model of the onboard speech recognition system. Such a recognition model can be formed based on a HMM, for example. A sequence of syllables is a succession of syllables, each describing parts of a word. It is the succession of syllables that the statistical recognition model was able to identify in the voice input. In addition or as an alternative, the result pattern can comprise a list of possible recognition results of a statistical language model of the onboard speech recognition system. Such a language model can be a statistical language model (SLM), for example. Such a language model can be used, for example, to combine a sequence of syllables identified by the recognition model to form one or more possible words. If multiple recognition results are possible, said list of possible recognition results is obtained. For example, a recognition model can generate the sequence of syllables "ta-tsch-creen" for a voice input of "touchscreen," from which the language model could, in turn, generate the following list of possible recognition results: "touchscreen," "touch me." The list entries can be organized in the order of the so-called confidence value, which indicates how likely it is that the list entry represents a correct recognition result. This can be expressed, for example, in the form of a so-called log likelihood value of the confidence. A result pattern comprising the sequence of syllables and/or the list of possible recognition results has the advantage that no evaluation of a recognition context, for example of the present operating context (presently activated functions or devices in the motor vehicle), is required to ascertain the recognition situation.

One embodiment provides for a notice about the interrupted communication link to be output to the user in the case that the present recognition result is discarded in the offline mode (since the comparison result indicates a deviation). This yields the advantage that the user is only informed about the interrupted communication link and, for example, distracted from driving the motor vehicle when this is in fact relevant. If, in contrast, the recognition result of the onboard speech recognition system can be utilized, which is to say does not have to be discarded, the notice about the interrupted communication link is irrelevant for the user.

One embodiment provides for the agreement criterion, based on which an agreement of the present result pattern with entries in the pattern memory unit is identified in the pattern memory unit, to include the following. It may be required that a percentage of agreement between the result pattern and a result pattern stored in the pattern memory unit has to be greater than a predetermined threshold value. It is thus not necessary to require one hundred percent agreement, but the threshold value can be in a range of less than 100 percent, for example, such as greater than 50 percent or greater than 60 percent or greater than 70 percent. In addition or as an alternative, it may be required, in general, by the agreement criterion that the result pattern describes the same recognition situation. In other words, the pattern memory unit can describe a plurality of or multiple possible recognition situations, and a check is then carried out as to whether the present result pattern describes or identifies one of the possible recognition situations. Each recognition situation may be described, for example, by at least one representative recognition pattern, which can be compared to the present recognition pattern. The embodiment has the advantage that it is also possible to identify similar result patterns (not one hundred percent agreement) as agreeing, so that the content of the pattern memory unit can also be utilized if no one hundred percent agreement is yielded.

With respect to checking an agreeing recognition situation, one embodiment provides for a result pattern to be stored in the pattern memory unit (in the online mode) to be categorized into one of several possible recognition situations in the pattern memory unit. Advantageously, it is thus not necessary to store each result pattern individually, but categories are formed, these being possible recognition situations. In this way, it is possible to combine or categorize multiple result patterns in one recognition situation. This increases the efficiency of the pattern memory unit.

It may be provided in the pattern memory unit that one or more possible recognition situations are defined, wherein each is assigned a respective representative comparison result. This representative comparison result can be an average value from the comparison results of the underlying individual recognition patterns, for example. One embodiment provides for this purpose that additionally a value is stored for each possible recognition situation, the value being referred to here as a temporal weighting component. Thus, a temporal weighting component is also managed for every possible recognition situation. The temporal weighting component indicates how many result patterns have already been entered or are present for the particular recognition situation. The weighting component thus indicates how often the particular recognition situation has in fact already occurred or been observed in the online mode. This advantageously provides a value as to how reliable the comparison result stored for the recognition situation is. If, in the offline mode, an agreement exists with a possible recognition situation, and the associated comparison result indicates a deviation, the present recognition result is only discarded in the event that the weighting component for the recognition situation is greater than a predetermined threshold value. In other words, a comparison result from the pattern memory unit is only used to evaluate or check a recognition result if a sufficient statistical description or substantiation (weighting component greater than the threshold value) exists for the particular recognition situation.

One embodiment enables what is known as cloud-based training or filling of the pattern memory unit. At least one comparison result is used for this purpose, which was ascertained in at least one other motor vehicle while the same was in offline mode. At least one additional recognition pattern, together with a respective associated comparison result from at least one other motor vehicle and/or from a vehicle-external central control device, is received for this purpose and stored in the pattern memory unit. However, these do not have to be individual recognition patterns, together with the associated comparison result. In general, it is possible to receive pattern memory unit data from at least one other motor vehicle and/or from a vehicle-external central server device and to store this in the pattern memory unit. Such a server device can be a server of the Internet, for example. Pattern memory unit data can be received from another motor vehicle via a vehicle-to-vehicle communication link. For example, pattern memory unit data can be received from the server device via an Internet connection. The pattern memory unit data advantageously allows comparison results or check results from other motor vehicles to be utilized to supplement the pattern memory unit, for example so as to yield a higher value for at least one temporal weighting component.

So as to be able to carry out the method according to the present disclosure in a motor vehicle, the present disclosure provides a control device for a motor vehicle. The control device can be configured as a control unit of the motor vehicle, for example. The control device comprises a processor unit, which is configured to carry out an embodiment of the method according to the present disclosure. The processor unit can comprise at least one microcontroller and/or at least one microprocessor for this purpose. The processor unit can include program code, which is configured to carry out the embodiment of the method according to the present disclosure when executed by the processor unit. The program code can be stored in a data memory of the processor unit. When the method is being carried out, the processor unit thus operates said arbiter unit, which can be designed or implemented as a program module, for example.

Finally, the present disclosure also encompasses a motor vehicle, which comprises one embodiment of the control device according to the present disclosure. The motor vehicle according to the present disclosure is, in particular, designed as a car, for example a passenger car or a truck.

The present disclosure also encompasses the combinations of the described embodiments.

BRIEF DESCRIPTION OF THE DRAWINGS

Other advantages, features and details of the present disclosure result from the claims, the description of embodiments below, and the drawings, in which:

DETAILED DESCRIPTION

Figure 1:
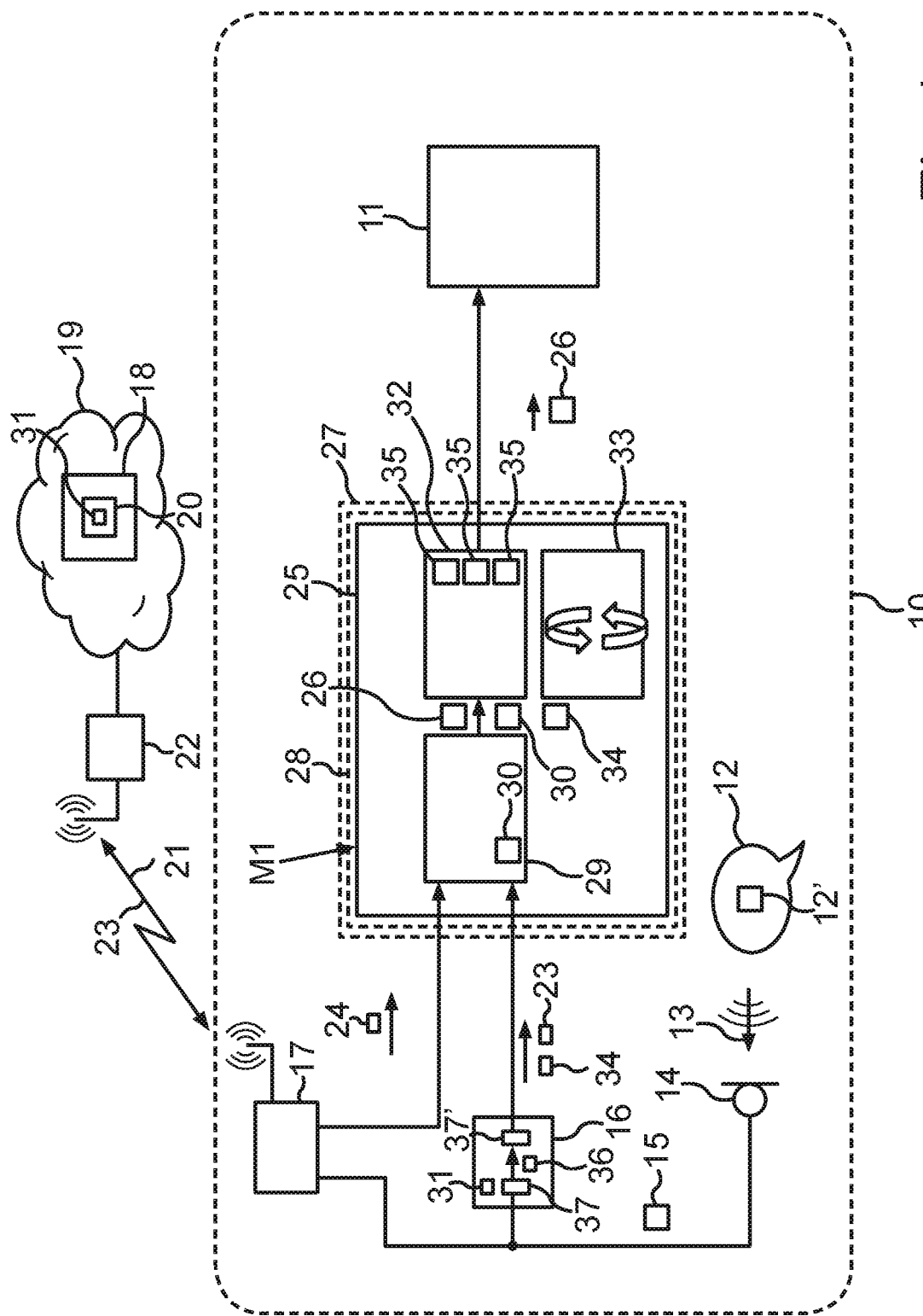
FIG. 1 shows a schematic illustration of an example motor vehicle in and online mode according to embodiments of the present disclosure.

The exemplary embodiments described hereafter are embodiments of the present disclosure. In the exemplary embodiments, the described components of the embodiments in each case represent individual features which are to be considered independently of one another and which also refine the present disclosure independently of one another and, as a result, shall also be considered to be an integral part of the present disclosure, either individually or in a combination other than the one shown. Furthermore, the described embodiments may also be supplemented with additional of the above-described features of the present disclosure.

In the figures, functionally equivalent elements are each denoted by the same reference numerals.

FIG. 1 shows a motor vehicle 10, which may be a car, and in particular a passenger car or a truck. The motor vehicle 10 can provide voice control for a vehicle component 11. For this purpose, a user can provide or make a speech utterance 12. The utterance 12 can have a speech content 12'. The speech content 12' can, for example, be a voice command for operating the vehicle component 11.

The speech utterance 12 can be detected in or on the motor vehicle 10 as speech sound 13 by a microphone system 14, which can comprise one or more microphones. The microphone system 14 can convert a speech signal of the speech utterance 12 from the speech sound 13 into a voice input 15. The voice input 15 can be an electrical and/or digital signal. The voice input 15 can be transmitted to a vehicle's own or a vehicle-internal onboard speech recognition system 16 and, via a communication device 17, to a server device 18 of the Internet 19, which can operate or provide an online speech recognition service 20. The communication device 17 can comprise a mobile communication module and/or a wireless local area network (WLAN) module, for example. The transmission to the server device 18 can take place via a communication link 21, which can also include a radio link, for example. For example, a radio link 23 can be provided as an integral part of the communication link 21 between the communication device 17 and a mobile communication network 22. The mobile communication network 22 can be used to transmit the voice input 15 to the server 18 via the Internet 19. As a function of or based on the voice input 15, the onboard speech recognition system 16 can generate a recognition result 23, which indicates what speech content 12' in the voice input 15 was identified. Accordingly, the online speech recognition service 20 of the server device 18 can transmit a recognition result 24 via the communication link 21 back to the motor vehicle 10.

Since two recognition results 23, 24 are now available, a decision is made, in the case of the motor vehicle 10 by way of an arbiter unit 25, which of the recognition results 23, 24 is to be used as the final recognition result 26, which will be used as a basis for controlling the vehicle component 11. For example, the vehicle component 11 can be a speech dialog system and/or a voice control system.

The arbiter unit 25 can be implemented, for example, by a control device 27, for example a control unit of the motor vehicle 10. The arbiter unit 25 can be implemented as program code, for example, which can run or be executed on a processor unit 28 of the control device 27.

The arbiter unit 25 can comprise a decision logic unit 29, which compares the two recognition results 23, 24. The comparison is indicated as a comparison result 30, which shows or indicates whether a deviation of the recognition result 23 of the onboard speech recognition system 16 from the recognition result 24 of the online speech recognition service exists. It may be provided that, in such a case, the recognition result 24 of the online speech recognition service 20 will be used as the final recognition result.

This check can be provided, for example, when it is recognized by the online speech recognition service 20 and the onboard speech recognition system 16 that the voice input 15 is part of a recognition vocabulary 31 that is also provided by the onboard speech recognition system 16. However, since the online speech recognition service 20 is able to provide more processing resources, the recognition vocabulary 31 can additionally also be provided by the online speech recognition service 20, the speech recognition taking place here with greater reliability. The decision logic unit 29 thus carries out a plausibility check of the recognition result 23 of the onboard speech recognition system 16, but utilizes the recognition result 24 of the online speech recognition service 20 if the comparison result 30 indicates a deviation. The final recognition result 26, in this case, will then be the recognition result 24.

In the event that the online speech recognition service 20 is not available, the recognition result 23 must be used. Nonetheless, there will also be an interest in this instance in having the option to have this recognition result 23 of the onboard speech recognition system 16 checked. For this purpose, the arbiter unit 25 can comprise a pattern memory unit 32 and an adaptive temporal weighting component 33. For the pattern memory unit 32, a result pattern 34 is also received by the arbiter unit 25 from the onboard speech recognition system 16, in addition to the recognition result 23. For example, the result pattern can include, as content, a list of several possible recognition results from a statistical language model 37' of the speech recognition system 16 (statistical language model, SLM) and/or a sequence of syllables 36 from a statistical recognition model 37 of the onboard speech recognition system 16. For example, on the onboard speech recognition system 16, it may be provided that the voice input 15 is analyzed for possible syllables and the succession thereof by way of the statistical recognition model 37, and the resulting sequence of syllables 36 is converted into several possible recognition results by way of the statistical language model 37'. From this, the actual recognition result 23 to be used can be selected as the best or most likely recognition result. Since now the recognition pattern 34, together with the underlying sequence of syllables 36 and/or the possible remaining recognition results, is also provided, the overall recognition situation resulting from the view of the onboard speech recognition system 16 is described.

The result pattern 34 can now be stored, together with the comparison result 30, in the pattern memory unit 32. The pattern memory unit 32 can be implemented as a database for this purpose. It may be provided that the result pattern 24 is assigned to one of several possible recognition situations 35. In this way, the result pattern 34 is categorized. A management process can then be carried out for the selected recognition situation 35 as to whether or not the comparison result 30 indicated a deviation of the onboard speech recognition system 16 from the online speech recognition service 20. Furthermore, a management or counting process can be carried out for each recognition situation 35 by way of the temporal weighting component 33 as to how often a comparison result 30 has previously been stored or used for the particular recognition situation 35.

The mode of operation of the arbiter unit 25 shown in FIG. 1 corresponds to an online mode M1, in which the communication link 21 is available, and thus also the recognition result 24 of the online speech recognition service 20 is available.

Figure 2:
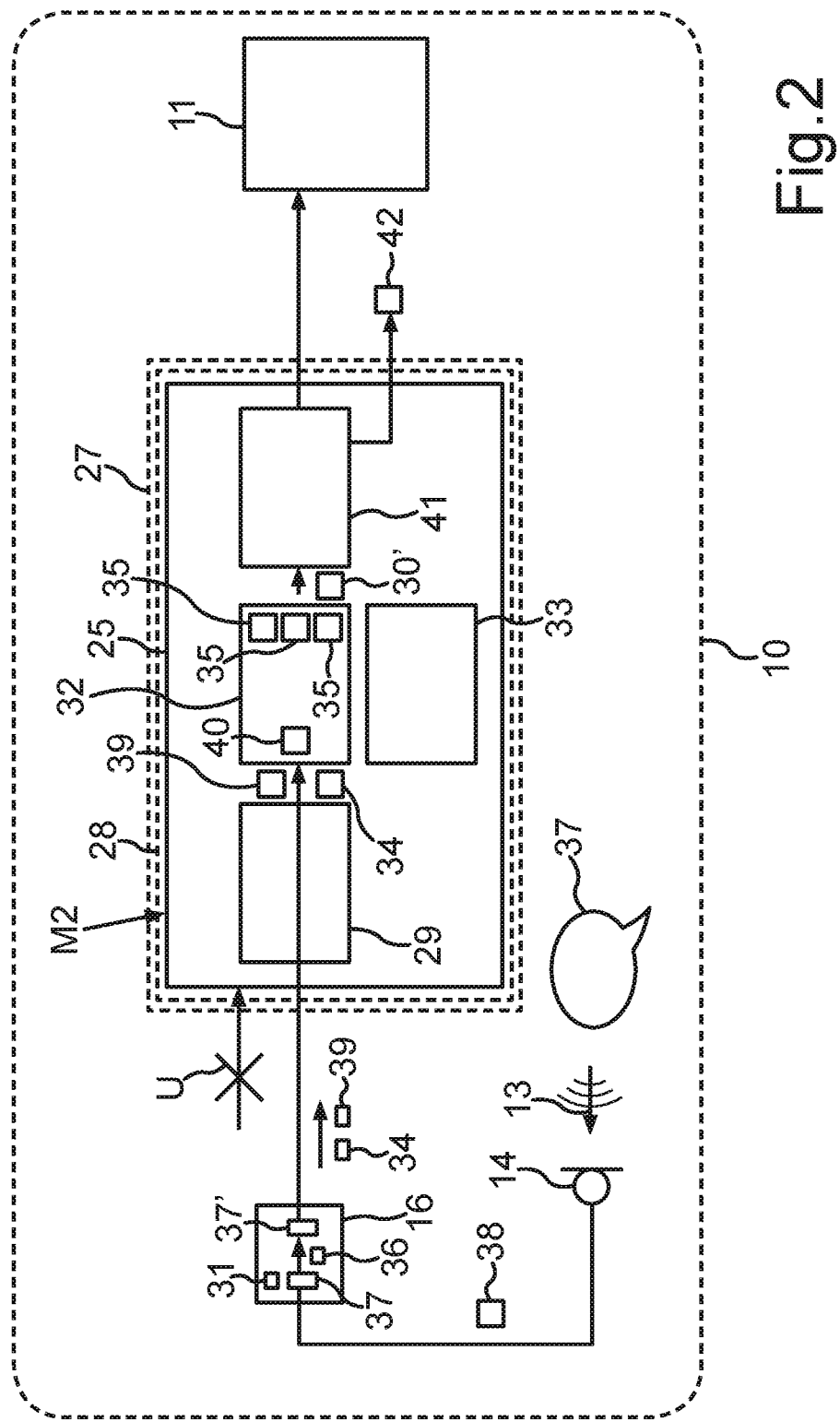
FIG. 2 shows a schematic illustration of an example motor vehicle in an offline mode according to embodiments of the present disclosure.

FIG. 2, in contrast, shows the arbiter unit 25 in an offline mode M2, in which an interruption U exists in the communication link 21, so that no recognition result 24 of the online speech recognition service 20 can be received. If a further speech utterance 37 occurs, the associated voice input 38 has to be analyzed exclusively by way of the onboard speech recognition system 16 in the described manner, which is to say the voice input 38 has to be assigned a recognition result 39, for example by way of the statistical recognition model 37 and the statistical language model 37'. Furthermore, for the purpose of monitoring or checking the recognition result 39, the result pattern 34, together with the recognition result 39, can now be provided again in the described manner to the arbiter unit 25. The decision logic unit 29 cannot make a decision here since a recognition result of the online speech recognition service 20 is absent. However, a possible recognition situation 35 can now be selected in the pattern memory unit 32 for the result pattern 34, which according to a predetermined agreement criterion 40 has a predetermined minimum agreement with the result pattern 34. Since the weighting component 33, with respect to the recognition situation 35, manages how reliable the statistics are for the recognition situation 35, a decision can be made as to whether the pattern memory unit 32 is to be utilized for checking the recognition result 39. If the weighting component is above a threshold value for this recognition situation 35, the pattern memory unit 32 can be utilized, which is to say it is ascertained, with respect to the recognition situation 35, how likely it is that, or to what extent, the comparison results 30 stored for the recognition situation indicate that the online speech recognition service 20 would have generated the same recognition result in the recognition situation 35 as the recognition result 39 of the onboard speech recognition 16. If, additionally, the (average) comparison result stored in this regard shows, with respect to the recognition situation 35, that a deviation occurred between the onboard speech recognition system 16 and the online speech recognition service 20, the recognition result 39 can be discarded by a rejection component 41. If, in contrast, the ascertained comparison result from the pattern memory unit 32 indicates that an agreement exists, the recognition result 39 can be forwarded to the vehicle component 11.

In the event that the recognition result 39 is discarded, a notice 42 regarding the interruption U of the communication link 21 can be output to a user of the motor vehicle 10 who, for example, provided the speech utterance 37.

Figure 3:
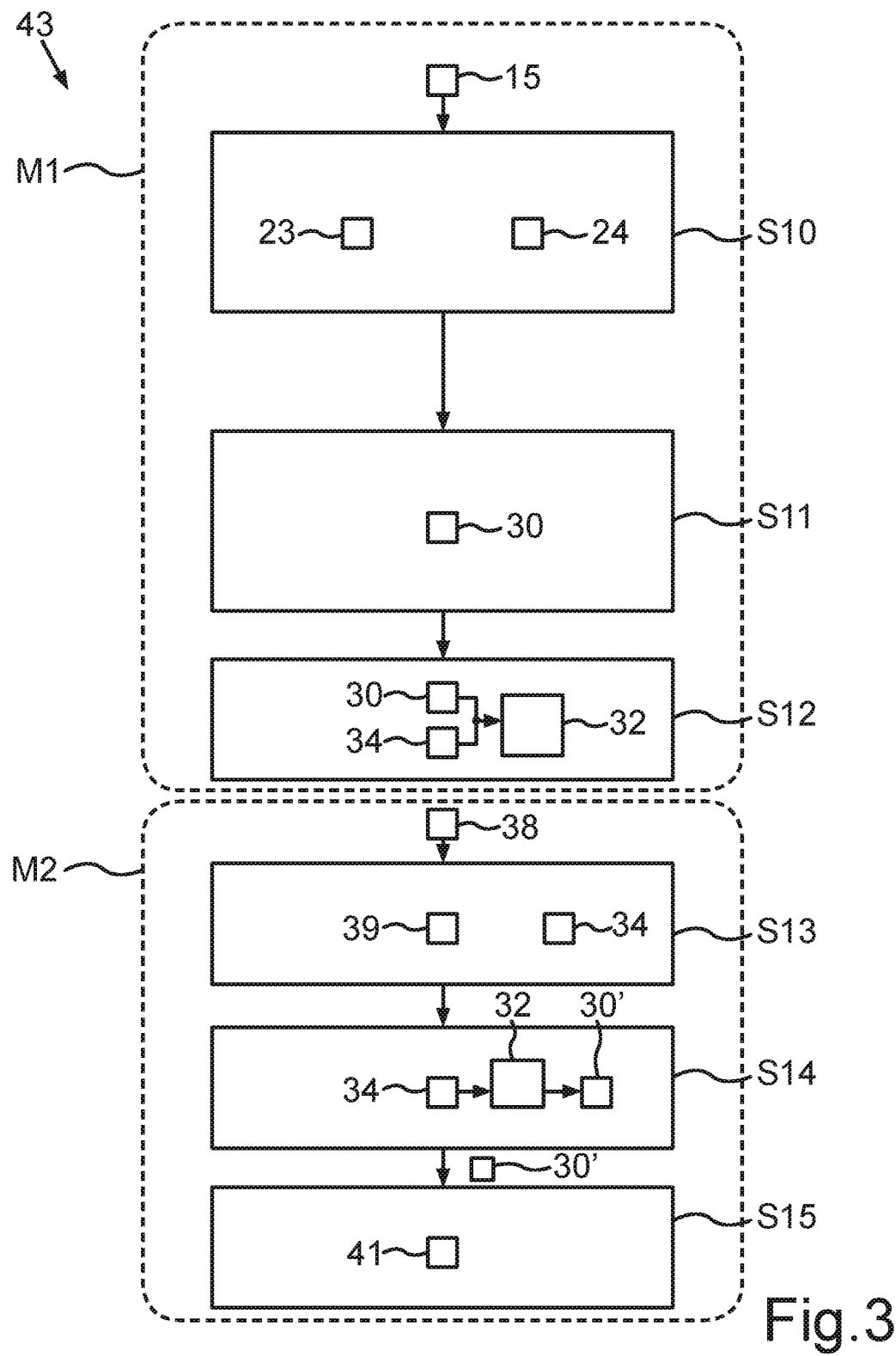
FIG. 3 shows a flow chart of an embodiment of a method according to embodiments of the present disclosure.

FIG. 3 again illustrates an embodiment of a method 34 as it can be carried out by the control device 27. In the online mode M1, the arbiter unit 25, in a step S10, can receive both a recognition result 24 of an online speech recognition service 20 coupled via the communication link 21, and a recognition result 23 of the onboard speech recognition system 16, for at least one voice input 15 of a user, and can ascertain, in a step S11, a comparison result 30 indicating whether the two recognition results deviate from one another. In a step S12, additionally a result pattern 34, which describes a respective present recognition situation of the onboard speech recognition system 16, can be received from the onboard speech recognition system 16 for the voice input 15, and the result pattern 34, together with the associated comparison result 30, can be stored in the pattern memory unit 32.

In the offline mode M2, in which the communication link 21 to the online speech recognition service 20 is interrupted, the arbiter unit 25, in a step S13, can then receive the recognition result 39 of the onboard speech recognition system 16 and the associated present result pattern 34 for a further voice input 38. In a step S14, a search can be carried out in the pattern memory unit 32 for a stored result pattern agreeing with the present result pattern 34 according to the agreement criterion 40, and the associated comparison result 30' thereof can be ascertained. In a step S15, the present recognition result 39 can be discarded, for example by the rejection component 41, in the event that the comparison result 30' indicates a deviation.

The weakness of present hybrid speech recognition systems is thus that the system has a less comprehensive onboard speech recognition system when a data link is absent. In many cases, this causes the onboard speech recognition system to identify an incorrect term. Since this, in general, nonetheless still exceeds the recognition threshold value, and previously has constituted the only decision-making criterion for the arbiter (arbiter unit 27), the recognition result, which of course is incorrect, continues to be used. This, in turn, causes the speech recognition system to be perceived to be less valuable by the customer or, in the worst case, to result in customer complaints. The self-learning arbiter for hybrid speech recognition systems should remedy this situation. The basic idea is that the arbitration rules are not statically defined, as has been the case until now, up to the time of delivery of the vehicle, but continuously develop during the entire life of the vehicle based on the search terms used by the customer, and the resulting results pattern.

The self-learning arbiter is an advancement of the previous arbiter. Previously, situations experienced in the hybrid speech recognition system have been categorized and permanently stored by a hybrid result pattern memory unit. A temporal weighting component ensures that a decision is not based on one-time recognition results, but that this decision logic unit grows steadily.

If a situation now occurs in which the online connection is absent, a decision will not be made, as has been the case in the past, based solely on the confidence of the onboard recognition system, but additionally a check is carried out by a rejection component. The spoken command is compared to recognition situations stored previously in the result pattern memory unit. If a very high percentage of the spoken pattern corresponds to the previously stored pattern, the procedure stored in the past will be used again, even in the absence of an existing data connection. If the topic identified onboard in the past did not correspond to the topic ascertained by way of the online recognition system, the onboard result is discarded, and the customer is notified about the absent online connection. If the online and the onboard results entirely agree, the onboard result continues to be used. The recognition reliability thus attained significantly increases the quality of the speech recognition system, even without an online data connection.

Hybrid result pattern memory unit: Within the hybrid result pattern memory unit, each recognition situation 35 is categorized and permanently stored, both online and onboard. The result pattern memory unit of the pattern memory unit unit 32 stores the entire situation, and not only the best recognition result. Since the entire recognition situation is permanently saved already prior to the semantic interpretation, it is possible to draw good conclusions about the entire phrase spoken by the user, which is to say the speech content 12'. The self-learning arbiter 25 thus learns with every recognition situation, and in particular in a manner specifically adapted to the vehicle owner.

Temporal weighting component 33: The temporal weighting component 33 is used to ensure that potentially incorrect decisions are not already made in the arbiter the first time the recognition situation occurs. Instead, the entire weighting is assigned only after the recognition situation has occurred in the number (n). Until then, the existing value is increased by the factor (m) every time the recognition situation occurs, until the maximum defined weighting value (max) has been reached. In this way, the self-learning arbiter learns not only via the content component, but also via the temporal component.

Rejection component 41: The rejection component 41 checks the validity of the onboard result. If it was already established in earlier recognition situations that the topic identified onboard does not agree with the topic supplied by the online recognition system, and if the weighting component is already high enough for this recognition situation, the onboard topic is rejected (rejection), and the customer is notified of the absent online connection.

Overall, the examples show how the present disclosure can provide a self-learning onboard arbiter unit for a hybrid speech recognition system.

The invention claimed is:

1. A method for checking an onboard speech recognition system of a motor vehicle, the method comprising:
receiving, by an arbiter unit of the motor vehicle in an online mode, both a recognition result of an online speech recognition service coupled via a communication link, and a recognition result of the onboard speech recognition system for at least one voice input of a user;
determining a comparison result which indicates whether the recognition result of the online speech recognition service and the recognition result of the onboard speech recognition system deviate from one another;
receiving a result pattern from the onboard speech recognition system for the at least one voice input, the result pattern describing a respective present recognition situation of the onboard speech recognition system;
updating a pattern memory unit for recognition situations based at least in part on the result pattern and the associated comparison result;
receiving, by the arbiter device in an offline mode in which the communication link to the online speech recognition service is interrupted, a recognition result of the onboard speech recognition system and an associated present result pattern for at least one further voice input; and identifying, in the pattern memory unit, a stored recognition situation that agrees with the present result pattern for the at least one further voice input according to a predetermined agreement criterion; and determining an associated comparison result which indicates whether the stored recognition situation and the present result pattern for the at least one further voice input deviate from one another;

wherein when the comparison result indicates a deviation, the recognition result of the at least one further voice unit is discarded.

2. The method according to claim 1, wherein the result pattern for the at least one voice input and the result pattern for the at least one further voice input respectively include at least one of a sequence of syllables identified by a statistical recognition model of the onboard speech recognition system or a list of possible recognition results of a statistical language model of the onboard speech recognition system.

3. The method according to claim 1, wherein a notice about the interrupted communication link is output to the user when the recognition result of the at least one further voice unit is discarded in the offline mode.

4. The method according to claim 1, wherein the predetermined agreement criterion includes that a percentage of agreement has to be greater than a predetermined threshold value, or that the same recognition situation is described.

5. The method according to claim 1, further comprising categorizing the result pattern for the at least one voice input into one of several possible recognition situations in the pattern memory unit; and wherein updating the pattern memory unit comprises updating the pattern memory unit based at least in part on the categorizing.

6. The method according to claim 5, wherein a temporal weighting component is managed for each possible recognition situation, the temporal weighting component indicating how many result patterns are present for the particular recognition situation, and, wherein in the offline mode, the present recognition result based on an agreement with a possible recognition situation is discarded if the weighting component for the recognition situation is greater than the predetermined threshold value.

7. The method according to claim 1, wherein pattern memory unit data is received from at least one other motor vehicle or from a central server device external to the vehicle and is stored in the pattern memory unit.

8. A control device for a motor vehicle, wherein the control device comprises a processor unit, which is configured to:

receive, in an online mode, both a recognition result of an online speech recognition service coupled via a communication link, and a recognition result of an onboard speech recognition system for at least one voice input of a user;

determine a comparison result which indicates whether the recognition result of the online speech recognition service and the recognition result of the onboard speech recognition system deviate from one another;

receive a result pattern from the onboard speech recognition system for the at least one voice input, the result pattern describing a respective present recognition situation of the onboard speech recognition system;

update a pattern memory unit for recognition situations based at least in part on the result pattern and the associated comparison result, receive, in an offline mode in which the communication link to the online speech recognition service is interrupted, a recognition result of the onboard speech recognition system and an associated present result pattern for at least one further voice input;

identify, in the pattern memory unit, a stored recognition situation that agrees with the present result pattern for the at least one further voice input according to a predetermined agreement criterion; and determine an associated comparison result which indicates whether the stored recognition situation and the present result pattern for the at least one further voice input deviate from one another;

wherein when the comparison result indicates a deviation, the recognition result of the at least one further voice unit is discarded.

9. A motor vehicle comprising a control device configured to:

receive, in an online mode, both a recognition result of an online speech recognition service coupled via a communication link, and a recognition result of an onboard speech recognition system for at least one voice input of a user;

determine a comparison result which indicates whether the recognition result of the online speech recognition service and the recognition result of the onboard speech recognition system deviate from one another;

receive a result pattern from the onboard speech recognition system for the at least one voice input, the result pattern describing a respective present recognition situation of the onboard speech recognition system;

update a pattern memory unit for recognition situations based at least in part on the result pattern and the associated comparison result;

receive, in an offline mode in which the communication link to the online speech recognition service is interrupted, a recognition result of the onboard speech recognition system and an associated present result pattern for at least one further voice input;

identify, in the pattern memory unit, a stored recognition situation that agrees with the present result pattern for the at least one further voice input according to a predetermined agreement criterion; and determine an associated comparison result which indicates whether the stored recognition situation and the present result pattern for the at least one further voice input deviate from one another;

wherein when the comparison result indicates a deviation, the recognition result of the at least one further voice input is discarded.

* * * * *